United States Patent
Hashiba

[11] Patent Number: 5,193,412
[45] Date of Patent: Mar. 16, 1993

[54] STEERING WHEEL

[75] Inventor: Takahiro Hashiba, Aichi, Japan

[73] Assignee: Toyoda Gosei Co., Ltd., Nishikasugai, Japan

[21] Appl. No.: 704,595

[22] Filed: May 23, 1991

[30] Foreign Application Priority Data

Jun. 23, 1990 [JP] Japan ............... 2-165019

[51] Int. Cl.⁵ .............................................. B62D 1/04
[52] U.S. Cl. ................................. 74/552; 200/61.54; 280/750; 74/484 H
[58] Field of Search .......... 74/552, 492, 484 H; 200/61.35, 61.54, 61.55, 61.56, 61.57; 280/750

[56] References Cited

U.S. PATENT DOCUMENTS

| | | | |
|---|---|---|---|
| 3,223,797 | 12/1965 | Ordorica et al. | |
| 3,517,145 | 6/1990 | Wallace | 200/61.57 |
| 4,485,371 | 11/1984 | Yamada et al. | 74/552 |
| 4,594,486 | 6/1986 | Noda | 200/61.54 |
| 4,712,446 | 12/1987 | Kamata et al. | 74/552 |
| 4,872,364 | 10/1989 | Kaga et al. | 200/61.55 |

FOREIGN PATENT DOCUMENTS

| | | | |
|---|---|---|---|
| 0292038 | 11/1988 | European Pat. Off. | 74/552 |
| 1947620 | 4/1970 | Fed. Rep. of Germany | 200/61.54 |
| 2943345 | 4/1981 | Fed. Rep. of Germany | |
| 1471447 | 3/1967 | France | 200/61.55 |
| 60-823 | 1/1985 | Japan | |
| 60-34052 | 3/1985 | Japan | |
| 60-133542 | 9/1985 | Japan | |
| 0050270 | 3/1987 | Japan | 74/552 |
| 0050272 | 3/1987 | Japan | 74/552 |
| 2002963 | 2/1979 | United Kingdom | 200/61.54 |
| 2061622 | 5/1981 | United Kingdom | |

Primary Examiner—David A. Scherbel
Assistant Examiner—Winnie Yip
Attorney, Agent, or Firm—Cushman, Darby & Cushman

[57] ABSTRACT

A steering wheel assembly includes a horn switch in a horn pad. An insert is attached integrally to the backside of a pad cover to form the horn pad while defining a space therebetween. The insert is made of a hard electrical insulating material while the pad cover is made of a soft synthetic resin. A sheet member is disposed in the space between the insert and the pad cover. A resilient member such as a coil spring urges the sheet member toward the pad cover while supporting it movably in the space. A fixing frame made of a sheet metal secures the insert. A moving contact is arranged on the sheet member while a fixed contact is fitted on the fixing frame so as to face the moving contact. These contacts operate as switching elements.

7 Claims, 3 Drawing Sheets

STEERING WHEEL

BACKGROUND OF THE INVENTION

1. Field of the Invention

This invention relates to a steering wheel, particularly to a steering wheel with a horn switch assembled within a horn pad which is located substantially at the center thereof.

2. Description of the Related Art

A steering wheel or a horn switch is disclosed in Japanese Laid Open Utility Model Publication No. 60-823, Japanese Laid Open Utility Model Publication No. 60-34052, and Japanese Laid Open Utility Model Publication No. 60-133542.

FIG. 3 shows a cross section of a conventional horn switch, while FIG. 4 shows a cross section of another conventional horn switch.

In the figures, a pad cover 1 is made of soft synthetic resin. An insert 2 is made of hard synthetic resin. The insert 2 is assembled integrally on the backside of the pad cover 1 to form a horn pad 3. A fixing frame 4 is made of metal and adapted to secure the insert 2. A sheet member 5 is also made of metal and disposed in a space 51 between the pad cover 1 and the fixing frame 4. A contact 6 is fitted to the sheet member 5 as a positive electrode. A contact 7 is supported on the fixing frame 4 as a negative electrode. The contacts 6 and 7 are arranged on opposite positions so as to be able to touch each other. These contacts 6 and 7 constitute contact means for a switching operation in an electric circuit for a horn.

A flanged spacer 9 is made of an electrical insulating material and has its flange engaged with the sheet member 5 to regulate movement thereof in the direction toward the pad cover 1. Thus, the sheet member 5 is supported via the spacer 9 in a movable manner relative to the fixing frame 4. A screw 10 secures the spacer 9 to the fixing frame 4. The fixing frame 4 has a through hole 11 formed therein that has a larger dimension than a dimension of the outer circumference of the spacer 9. The spacer 9 is slidably inserted into the through hole 11.

FIG. 3 shows a leaf spring 8 which urges the sheet member 5 toward the pad cover 1. An insulating sheet 12 is interposed between the leaf spring 8 and the fixing frame 4.

In FIG. 4, a coil spring 13 urges the sheet member 5 toward the pad cover 1 similarly to the leaf spring 8. The coil spring 13 is held between the fixing frame 4 and the sheet member 5 through a spring seat 14 formed of electric insulating material.

The horn switches of steering wheels, in the prior art, are constructed as above and assembled within the horn pad 3 composed of the pad cover 1 and the insert 2. In the normal state or when the horn switch is off, the positive contact 6 and the negative contact 7 are separated from each other by a predetermined distance.

To operate the horn switch, a driver pushes the pad cover 1 from the outside with a prescribed pressure so that the pad cover 1 is deformed to blow the horn. That is, as the pad cover 1 is deformed, the sheet member 5 inside thereof is moved toward the fixing frame 4 against the urging force of the spring 8 or spring 13. Then, the contacts 6 and 7 are touched together so as to close the electric circuit for the horn, thereby sounding the horn.

The horn pad 3 accommodating therein the horn switch is usually located substantially at the center of the steering wheel.

All elements of the switching device are assembled on the fixing frame 4 in the conventional horn switch as constructed above. On the other hand, the sheet member 5 with the contact 6 fixed thereto is movably supported in the space 51 between the pad cover 1 and the fixing frame 4 with the contact 7 secured thereto. Therefore, there must be provided some special insulating members like the spacer 9, insulating sheet 12 and spring seat 14, in order to electrically isolate the sheet member 5 and the fixing frame 4, both of which are made of metal.

Moreover, the insert 5 is fitted to the periphery of the backside of the pad cover 1 to form the horn pad 3 in the conventional horn switch. Thus, the insert 5 mainly serves as a support to hold the pad cover 1 while acting as a fixing member to secure the horn pad 3 to the fixing frame 4.

Consequently, the horn switch of the prior art inevitably has many parts and a complicated structure. Thus, the assembling thereof to the steering wheel is troublesome, an improvement of which is desirable.

SUMMARY OF THE INVENTION

In view of the above, it is an object of the invention to provide a steering wheel that has a horn switch of fewer parts and simple structure so that its assembling work is made easy.

In accordance with one preferred mode of the invention, there is provided a steering wheel that has a horn pad. The horn pad is composed of an insert assembled integrally on the backside of a pad cover with a space defined therebetween. The insert is made of an electrical insulating material, while the pad cover is made of a soft synthetic resin. A sheet member is disposed in the space between the insert and the pad cover. A moving contact is disposed on the sheet member while a fixed contact is secured on a position opposite the moving contact. The moving contact and the fixed contact form contact means for the switching operation.

Preferably, a resilient member urges the sheet member toward the pad cover while holding the sheet member in the space in a movable manner.

Preferably, the insert is made of a hard synthetic resin and secured on a metal fixing frame.

Preferably, the moving contact is provided on the fixing frame.

Further objects and advantages of the invention will be apparent from the following description, reference being had to the accompanying drawings, wherein preferred embodiments of the invention are clearly shown.

DETAILED DESCRIPTION OF THE PREFERRED EMBODIMENTS

A preferred mode of a steering wheel of the invention will be described hereafter.

Figure 1:
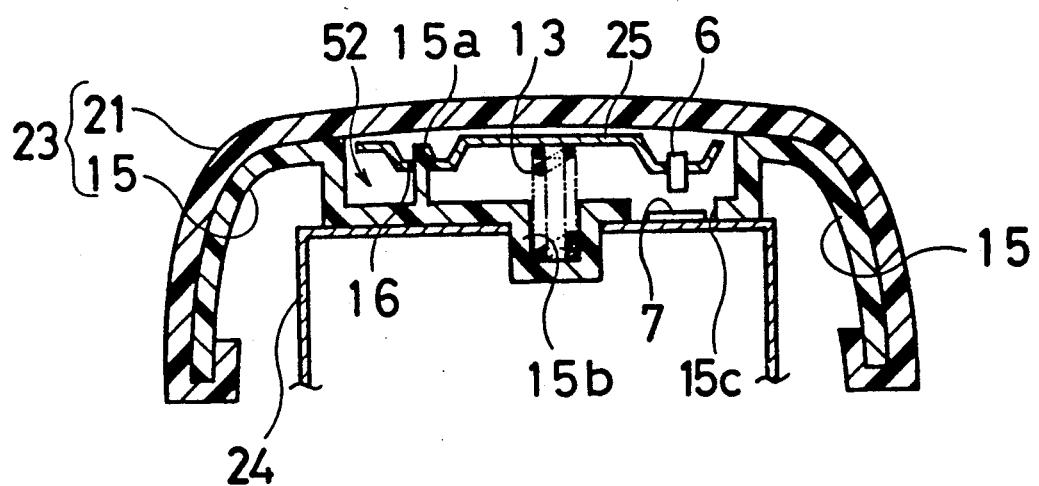
FIG. 1 is a sectional view showing a horn switch assembled in a preferred embodiment of a steering wheel of the invention.
Figure 2:
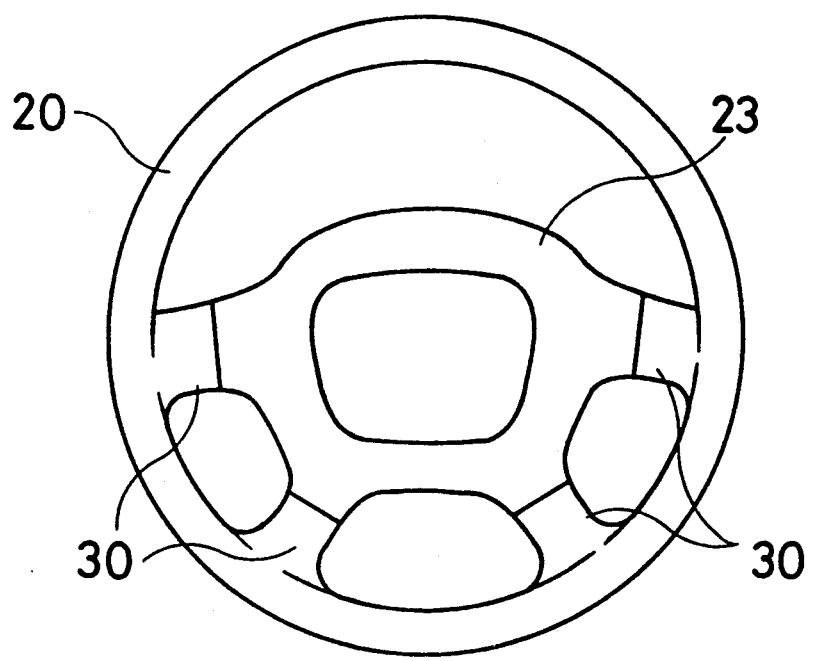
FIG. 2 is a plan view showing an appearance of a preferred embodiment of a steering wheel of the invention which has a horn switch assembled therein.
Figure 3:
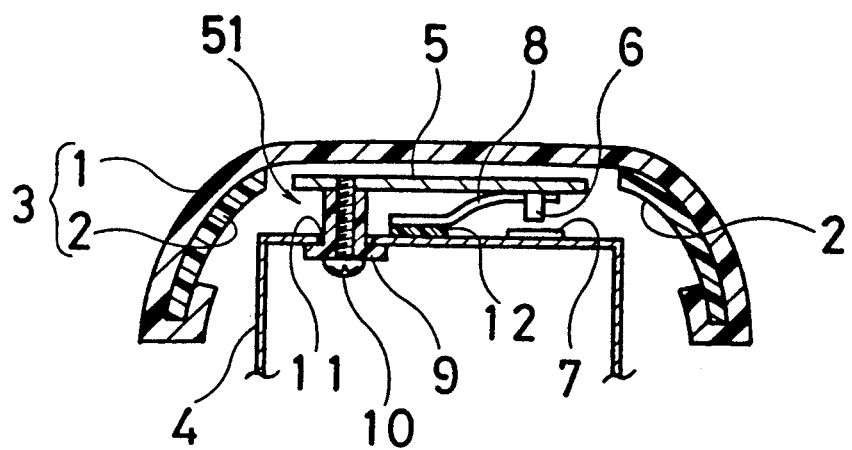
FIG. 3 is a sectional view showing a conventional horn switch.
Figure 4:
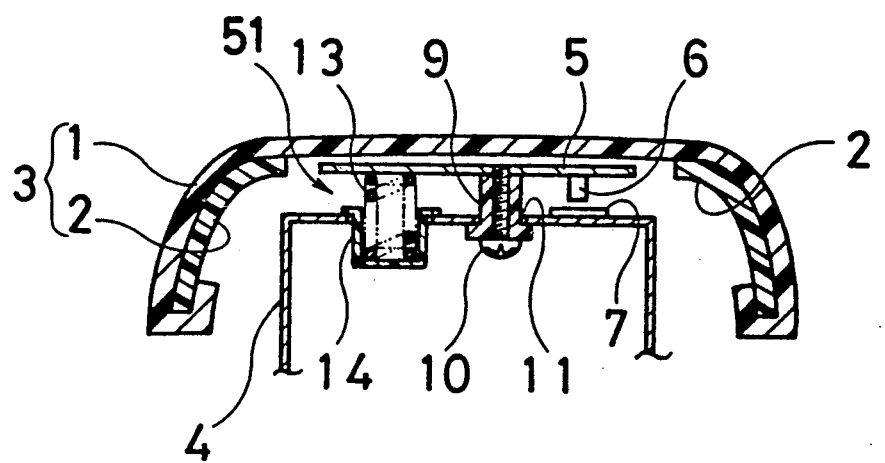
FIG. 4, is a sectional view showing an alternative conventional horn switch.

FIG. 1 illustrates a horn switch which is assembled in the preferred mode of the steering wheel of the invention. FIG. 2 illustrates an appearance of the steering wheel which has the horn switch assembled therein. In the figures, the same reference characters as those of the prior art designate like or corresponding parts of the present invention.

As shown in FIG. 1, an insert 15 is fitted to the backside of a pad cover 21 with a space 52 defined therebetween, thereby making one body or a horn pad 23. The insert 15 is made of an electrical insulating hard synthetic resin while the pad cover 21 is made of a soft synthetic resin. The insert 15 has its periphery contacted and firmly joined to the pad cover 21 via adhesive or the like. The insert 15 has its center arranged in relation to the pad cover 21 with the space 52 interposed therebetween. The center of the insert 15 is contacted and secured on a fixing frame 24 through adhesive or the like. The insert 15 is extended substantially over the whole surface of the backside of the pad cover 21 except a portion around the contact 7 on the fixing frame 24. That is, the insert 15 has a hole 15c in which the contact 7 is fixed on the fixing frame 14, and through which the contact 6 moves and touches the fixed contact 7.

A hook 15a as an engaging element is integrally formed on the insert 15. Preferably, a plurality of hooks 15a are disposed at properly separated positions on the insert 15 and protrude toward the sheet member 25. The hooks 15a regulate the sheet member 25 from moving in the direction toward the pad cover 21. Further, a spring seat or a fitting recess 15b is formed integrally on the insert 15. A coil spring 13, or a resilient member in the present embodiment, is held between the spring seat 15b and the sheet member 25. Preferably, a plurality of spring seats 15b and coil springs 13 are arranged at properly separated positions on the insert 15. The coil springs 13 urge the sheet member 25 toward the pad cover 21. The sheet member 25 has a through hole 16 bored thereon as an engaging hole. The hook 15a is inserted and fitted into the through hole 16. In the inserted state, the hook 15a has its claw at the top end engaged with the through hole 16 and regulated from detachment thereby, so that it does not come out of the through hole 16 easily. The portion of the hook 15a other than the claw can slide in the through hole 16. Accordingly, in the present embodiment, the sheet member 25 is held in the space 52 between the insert 15 and the pad cover 21 in a movable state through the coil spring 13 and the hook 15a. Moreover, the insert 15 has its center fixed to the fixing frame 24 such as to cover substantially all the surface of the frame 24 facing the pad cover 21, except the portion around the contact 7.

Preferably, the fixing frame 24 is formed of sheet metal and designed to be an energy absorbing member, thereby to moderately absorb energy together with the pad cover 21, the insert 15, etc., in case of collision. Urethane or soft polyvinyl chloride can be used as the soft synthetic resin to form the pad cover 21.

FIG. 2 shows an appearance of a steering wheel accommodating therein a horn switch.

In the figure, the horn pad 23 is located substantially at the center of a steering wheel 20. Spokes 30 support the steering wheel 20. FIG. 2 illustrates, as an example, the steering wheel 20 held by four spokes 30.

The horn switch of the present embodiment is constructed as above and assembled within the horn pad 23 in the same manner as the prior art. Further, as shown in FIG. 2, the horn pad 23 is arranged substantially at the center of the steering wheel 20.

Operation of the horn switch will be described hereafter.

In the present embodiment, when the horn switch is off, the contact 6 on the sheet member 25 is separated from the contact 7 on the fixing frame 24 by a predetermined distance. To operate the horn, the driver pushes the pad cover 21 from the outside with a predetermined pressure to deform the pad cover 21, thereby sounding the horn. Namely, the sheet member 25 inside the pad cover 21 moves toward the fixing member 24 against the urging force of the coil spring 13 in accordance with the deformation of the pad cover 21. Thus, contact means or the contacts 6 and 7 touch each other, closing the electric circuit for the horn and blowing the horn.

As mentioned above, the horn pad 23 is composed of the pad cover 21 and the insert 15 integrally joined, as in the prior art. Moreover, the insert 15 sustains the pad cover 21 while securing the horn pad 23 on the fixing frame 24.

Furthermore, in the present embodiment, all parts constituting the switching device assembled on the insert 15 are made of an electrical insulating material. The sheet member 25 holding the contact 6 is positioned within the space 52 between the insert 15 and the pad cover 21. Accordingly, additional insulating members, such as the spacer 9, insulating sheet 12 and spring seat 14, can be eliminated in order to electrically isolate the sheet member 25 from the fixing frame 24 or the moving contact 6 from the fixed contact 7.

In the present embodiment, the insert 15 is adapted for many applications. That is, it serves not only as a support to retain the pad cover 21 and a fixing member to secure the horn pad 23 on the fixing frame 24 like the conventional insert 2, but also as an assembly base for building up the components forming the switching device as well as an insulating member to electrically isolate the sheet member 25 from the fixing frame 24. Moreover, the insert 15 can be easily manufactured as an integral molded product of synthetic resin by injection molding or the like.

Accordingly, the steering wheel accommodating therein the horn switch of the present invention can lessen the number of components of the horn switch in comparison with the steering wheel horn switch of the prior art, simplify its construction and make the assembling work easy.

This invention may be practiced or embodied in still other ways without departing from the spirit and essential character thereof. For instance, while the insert 15 has the hook 15a inserted into the through hole 16 of the sheet member 25 and the sheet member 25 is movably held between the pad cover 21 and the insert 15 in the illustrated preferred embodiment, the spring for urging the sheet member 25 toward the pad cover 21 is not limited to the coil spring 13. The spring may alternately be a leaf spring, namely, any spring can be adapted as long as it serves as a resilient member. Further, the sheet member 25 may be made of a resilient material and be a leaf spring by itself so as to eliminate additional resilient members that are independently attached between the insert 15 and the sheet member 25. In this case, the coil springs 13 and the spring seats 15b of the insert 15 are accordingly unnecessary, so that the structure of the horn switch is made simpler as a whole. Also, the through hole 16 may be omitted from the sheet member 25. In this case, a plurality of hooks 15a may protrude from the insert 15 along the periphery of the sheet member 25. Each hook 15a has its claw hooked on the periphery of the sheet member 25 to retain it.

Moreover, while the contact 6 or the contact 7 is a separate component attached to the sheet member 25 or the fixing frame 24 in the present embodiment, the sheet member 25 or the fixing frame 24 may be partly protruded by press working or the like so that the projected portion serves as a contact.

The preferred embodiments described herein are therefore illustrative and not restrictive, the scope of the invention being indicated in the appended claims and all variations which come within the meaning of the claims are intended to be embraced therein.

What is claimed is:

1. A steering wheel comprising:
   a horn pad including a pad cover made of a soft synthetic resin and a unitary insert made of a hard electrical insulating material attached integrally to a backside of the pad cover, the insert having a peripheral area attached to a peripheral area of the back side of the pad cover so as to give rigidity to the peripheral area of the pad cover, while having a central area separated from a central area of the backside of the pad cover to establish a space therebetween;
   a sheet member supported by the insert so as to be disposed in the space between the insert and the pad cover and to be contactable via the space by the pad cover;
   a metal fixing frame securing immovably the central area of the insert on an upper surface of the fixing frame so that the insert is interposed between the sheet member and the fixing frame so as to insulate the sheet member and the fixing frame from each other; and
   contact means for a switching operation, including a moving contact provided on the sheet member and a fixed contact provided on the fixing frame at a position opposite the moving contact.

2. A steering wheel according to claim 1, wherein the fixing frame is made of a sheet metal such that it is operable as an energy absorbing member.

3. A steering wheel according to claim 2, wherein said insert has a portion substantially covering all of a surface of the fixing frame facing the pad cover while the fixed contact remains uncovered.

4. A steering wheel according to claim 1, wherein the insert has an engaging portion integrally formed thereon and projected therefrom toward the sheet member, and the sheet member has an engaging hole engaged with the engaging portion so as to regulate movement of the sheet member.

5. A steering wheel according to claim 1, which further comprises a resilient member movably supporting the sheet member in the space while urging the sheet member toward the pad cover, and wherein the insert has a fitting recess for retaining the resilient member.

6. A steering wheel according to claim 1, wherein the insert has a hole through which the moving contact can contact the fixed contact.

7. A steering wheel comprising:
   a horn pad including a pad cover made of a soft synthetic resin and a unitary insert made of a hard electrical insulating material attached integrally to a backside of the pad cover, the insert having a peripheral area attached to a peripheral area of the back side of the pad cover so as to give rigidity to the peripheral area of the pad cover, while having a central area separated from a central area of the backside of the pad cover to establish a space therebetween;
   a sheet member supported by the insert so as to be disposed in the space between the insert and the pad cover and to be contactable via the space by the pad cover;
   a metal fixing frame securing immovably the central area of the insert on an upper surface of the fixing frame so that the insert is interposed between the sheet member and the fixing frame so as to insulate the sheet member and the fixing frame from each other; and
   contact means for a switching operation, including a moving contact provided on the sheet member and a fixed contact provided on the fixing frame at a position opposite the moving contact;
   wherein the insert has an engaging portion integrally formed thereon and projected therefrom toward the sheet member, and the sheet member has an engaging hole engaged with the engaging portion so as to regulate movement of the sheet member.

* * * * *